United States Patent Office 3,684,516
Patented Aug. 15, 1972

3,684,516
PHOTO-SENSITIVE RESIN COMPOSITION
Masahito Ishii, Tokyo, Japan, assignor to Mitsui Mining & Smelting Co., Ltd., Tokyo, Japan
No Drawing. Filed Aug. 31, 1970, Ser. No. 68,483
Claims priority, application Japan, Oct. 17, 1969, 44/82,572
Int. Cl. C03c 1/68
U.S. Cl. 96—115 R    2 Claims

ABSTRACT OF THE DISCLOSURE

A photo-sensitive resin composition comprising an alcohol soluble polyamide resin combined with a salt of acrylic acid or methacrylic acid and acrylamide as the photo-sensitive crosslinking agent is extremely suitable for utilizing as the printing plate.

BACKGROUND OF THE INVENTION

(a) Field of the invention

The present invention relates to a photo-sensitive resin composition especially suitable for use in preparing a printing plate, and, more particularly, relates to a photo-sensitive resin composition comprising an alcohol soluble polyamide resin combined with a salt of acrylic acid or methacrylic acid and acrylamide as the photo-sensitive crosslinking agent.

(b) Description of the prior art

Since the invention of the photo-engraving process, metal has been utilized in preparing printing plates because of its solidity and the sharpness as well as the accuracy of the etching effect to be brought about. However, the complicated plate-making process, the troublesome plate-setting work, etc. coupled with the rapid progress of late in the field of synthetic chemistry, has given impetus to the utilization of various new materials—especially, synthetic rubber and synthetic resin.

In other words, when a photo-sensitive resin, for instance, is employed as the material for a printing plate, it demonstrates a plurality of advantages such as: (1) there is no need to apply any photoresist thereon; (2) the plate-making can be performed in a short period of time; (3) the printing ink spreads well on the plate and can be transferred onto paper satisfactorily; (4) the processings required for metallic plates such as abrasion, application of a photoresist, drying, burning, erosion, etc. are not necessary; (5) the plate can be wound round a rotary press; (6) the durability of the plate in printing is superior; and so forth.

The photo-sensitive resin composition for the foregoing purpose has so far been generally composed of those constituents which meet the following 4 functional requirements;

(1) basic material—such as alcohol soluble nylon, etc.,
(2) crosslinking agent—such as methylene bisacrylamide, etc.,
(3) sensitive-reaction initiator (vis sensitizer)—such as benzophenone, etc. and
(4) thermopolymerization inhibitor — such as hydroquinone, etc.

The crosslinking mechanism wherein such crosslinking agents as methylene bisacrylamide act to bridge polyamide resin has not been clarified yet, but it seems that said substance reacts with polyamide resin by the reaction of light as a crosslinking agent and also the substance per se comes to get photo-polymerized to thereby render the polyamide resin exposed to light insoluble in solvents (such as alcohol).

As to the crosslinking agents heretofore proposed, there are N-allyl acrylamide, hexahydro-1,3,5-triacryl S-triazine, hexahydro-1,3,5-trimethacryl S-triazine, ethylene glycol bisacryl maleate, diallyl maleate, N,N'-diallyl acrylamide, ethylene diacrylate, triallyl cyanurate, N,N'-alkylene bisacrylamides such as N,N'-methylene bisacrylamide, etc., 5-allylamino-N-allyl caproamide, acrylamino-N-allyl acetoamide, 2-acrylamino-N,N'-diallyl glutaramide, m-xylene bisacrylamide, p-xylene bisacrylamide, etc., but these substances have such drawbacks that they are extremely susceptible to thermopolymerization, defective in preservability, and, in addition, comparatively hard to synthesize and expensive.

The inventors with a view to overcoming such drawbacks in the prior art, have made a series of investigations and have found that a composition having superb thermal stability and excellent workability can be obtained by employing the salt of acrylic acid or methacrylic acid together with acrylamide as the crosslinking agent, and have achieved the present invention.

One object of the present invention is to provide a photosensitive resin composition consisting substantially of alcohol soluble polyamide resin and having superb thermal stability and excellent workability in processing.

Another object of the present invention is to provide a photo-sensitive resin composition consisting substantially of alcohol soluble polyamide resin and being particularly suitable for use in preparing printing plates.

SUMMARY OF THE INVENTION

The present invention relates to a photo-sensitive resin composition comprising an alcohol soluble polyamide resin, at least one member selected from the group consisting of salts of acrylic acids or methacrylic acids together with acrylamide as the crosslinking agent, a thermopolymerization inhibitor, and a light-reaction initiator.

The most characteristic feature of the present invention lies in the application of the salt of acrylic acid or methacrylic acid together with acrylamide as the crosslinking agent.

Acrylate (or methacrylate) and acrylamide are not capable of crosslinking polyamide individually, but can effect crosslinking only when employed by combining them at an appropriate ratio. The reaction mechanism on this occasion seems to work in this way: at the time of light-exposure, polymerization of acrylate or methacrylate and acrylamide takes place to form a copolymer; and the thus formed copolymer effects the crosslinking of polyamide resin, thereby rendering it insoluble in the solvent.

Employment of the crosslinking agent according to the present invention is accompanied by the following advantages.

(1) Both acrylate and methacrylate are extremely hard to polymerize by mere application of heat, and are stable even when subjected to considerably severe conditions such as heating at a temperature exceeding 230° C. for more than 30 minutes. Besides, they never get polymerized or decomposed under the influence of heat or light even when left standing for several years so that their preservability is superb.

(2) It displays superb dispersibility and moldability. In other words, either of acrylate and methacrylate dissolves mutually in the melted acrylamide (melting point: 85° C.) in a wide range of component ratio, bringing about uniform solutions. This solution has a property to plasticize polyamide resin, and not only brings down the temperature required for molding but also renders it possible to obtain uniform moldings quite smoothly from nylon chips of pellets merely by means of directly kneading them with a roll.

(3) Because of its remarkable crosslinking efficiency due to metal ions, the light-exposed and bridged portion of the resin composition under the present invention is possessed of strength and hardness in an extremely high degree and, accordingly, displays an excellent printing durability when employed for the printing plate. Besides, at the time of etching, the character images produced by sensitive-exposure undergo little swelling by the solvent (viz. etching liquid) and, therefore, the color loss (viz. thinning of the character images) is small, resulting in a high resolving power.

As to the ratio for combining acrylate or methacrylate with acrylamide in order to obtain an appropriate printing plate, it is desirable that the amount of acrylate or methacrylate to be employed be in the range of from more than 4 parts by weight to less than 40 parts by weight and the amount of acrylamide to be employed be in the range of from more than 4 parts by weight to less than 100 parts by weight per 100 parts by weight of polyamide resin, respectively. Further, any crosslinking agent known heretofore may also be mixed with the present composition to such an extent as will not hamper the effect of the crosslinking agent under the present invention.

The acrylate or methacrylate applicable in the present invention includes, for instance, the salts of zinc, lead, alkaline earth metal, cadmium and aluminum, and these salts can be employed either individually or upon mixing two or more of them. Besides, such substances as methacrylamide, diacetone acrylamide, etc. having properties chemically like acrylamide may also be employed in lieu of acrylamide.

As for the polyamide resin, photo-reaction initiator (viz. sensitizer) and thermopolymerization inhibitor for use in the present invention, those resins and compounds popular in the prior art are applicable.

As to said polyamide resin, it is to be an alcohol soluble polyamide resin, and, for instance, alcohol soluble aminocarboxylic acid polymer, dicarboxylic acid-diamine polymer, mixture-type polyamide resin comprising the foregoing polymers, such as a polymer synthesized from nylon salt and $\epsilon$-caprolactam, and methoxymethylated polyamide resin, etc. are applicable.

To be precise, such polyamide resins as polymers of $\epsilon$-caprolactam (nylon 6), condensation polymer consisting of hexamethylene diamine and adipic acid (nylon 66), condensation polymer consisting of hexamethylene diamine and sebacic acid (nylon 610), polymer of 11-aminoundecane acid (nylon 11), ring-opened polymer of $\alpha$-pyrrolidone (nylon 4); mixture-type polyamide resin and copolymerized polyamide resin obtained from the foregoing substances, such as copolymer of nylon salt (A H salt) and $\epsilon$-caprolactam, copolymer of nylon salt (A H salt) and 610 salt, ternary copolymer consisting of $\epsilon$-caprolactam, A H salt and 610 salt, copolymer consisting of A H salt, hexamethylene diamine and terephthalate, copolymer consisting of $\epsilon$-caprolactam and 3, 7-endoethylene caprolactam, copolymer consisting of A H salt and para-aminobenzoic acid, ternary copolymer consisting of para-aminocyclohexyl methane and salt of adipic acid/A H salt/caprolactam, copolymer of methaxylene diamine-isophthalic acid/terephthalic acid, copolymer employing 1.4 bis(3 - aminopropoxy)cyclohexane, copolymer employing transhexahydro - para-phenylene diamine, etc. and polyamide resin comprising linear macromolecules having —CONH— radical within a molecule are applicable.

As to said photo-recation initiator (viz. sensitizer) conventional substances such as benzophenone and derivative thereof, benzil, benzoin, benzoin acetate, benzoyl acid, acetophenone, quinones such as 2-methyl anthraquinone, benzoquinone, 1, 2-benzanthraquinone, anthrones such as 1,9-benzanthrone etc. are applicable.

As to said thermoploymerization inhibitor, such substances as are popular as the polymerization inhibitor but which do not hamper the photo-polymerization, like pyrogallol, quinone, hydroquinone, Methylene Blue, t-butyrocatechol, monobenzyl ether, methyl hydroquinone, amyl quinone, amyloxy hydroquinone, n-butyl phenol, phenol, hydroquinone monopropyl ether, and sulfur compound such as 2-mercaptobenzothiazole, ethylene thiourea, mercaptobenzimidazole, etc. are applicable.

As for the means of molding the polyamide resin composition according to the present invention, inasmuch as said polyamide resin is possessed of excellent thermal stability, it is feasible to shape it into a plate by means of heat-fusion processing such as hot-roll molding, hot-press molding or extrusion molding.

In case of preparing a printing plate by employing the thus molded plate consisting of said photo-sensitive resin composition, the molded plate is first provided with an appropriate lining, then exposed to ultraviolet rays through a negative, and subsequently subjected to etching by means of an etching liquid composed mainly of alcohol, whereby there is obtained an etched plate showing only a little color loss and provided with pretty character images.

As to the means of applying the ultraviolet rays, the conventional arc lamp or ultraviolet lamp is usable. The time of exposure depends on the kind and amount of sensitizer employed, but, when the exposure is effected by employing a 2 kw. arc lamp disposed at a distance of 60 cm. from the film, it is suitable to be in the range of from about 3 minutes to 6 minutes.

As to said etching liquid, both methyl alcohol and ethyl alcohol per se can be employed but they may contain water to the extent of 30%. Further, the employment of calcium chloride or the like in addition to said alcohol can accelerate the etching. Moreover, such organic solvents as chloroform, trichloroethylene, parachloroethylene, benzene, toluene, ethylene glycol or the like can also be added.

According to the present invention, there can be obtained a photo sensitive resin composition consisting mainly of alcohol soluble polyamide resin and featuring superb thermal stability as well as excellent workability in processing, and this composition, when empoyed for preparing a printing plate, can produce a plate which displays excellent printing durability and brings about just a little color loss and a high resolving power.

DESCRIPTION OF THE PREFERRED EMBODIMENTS

Hereunder given are examples embodying the present invention, but the description of these examples is not intended to limit the scope of the present invention.

EXAMPLE 1

To 100 parts by weight of alcohol soluble nylon (Ultramid 10 manufactured by BASF Co.) were added 15 parts by weight of zinc acrylate, 30 parts by weight of acrylamide, 2 parts by weight of benzophenone and 0.2 part by weight of hydroquinone, and the mixture thus obtained was subjected to fusion and kneading at 160° C. for 5 minutes by means of a test roll, taken out in the form of a sheet, folded and put in a metallic mold for glassy finishing, and subjected to pressure molding at 160° C. for 5 minutes by means of a hot press, whereby a 1 mm. thick sheet was prepared. Next, this sheet was bonded on a metal plate such as an aluminum plate, thereby preparing a material for a printing plate having a metallic lining. Subsequently, this material plate was exposed (for 4 minutes) to radiation with an arc lamp (of 2 kva. disposed at a distance of 60 cm.) through a negative film, and thereafter subjected to etching with methyl alcohol (or denatured ethyl alcohol for industrial use) by employing a paddle-revolving type etching machine (the number of rotations of paddle: 600 r.p.m., 900 r.p.m.), whereby there was obtained an etching plate as follows.

Etch factor: above 30; no color loss at all
Shoulder angle: 70°; appropriate
Hardness of exposed area (viz relief): M90
Etching speed: 0.05 mm./min.

EXAMPLE 2

The compositions prepared by severally employing calcium acrylate, barium acrylate, lead acrylate and cadmium acrylate in lieu of zinc acrylate employed in Example 1 were respectively molded into a sheet in the same way as in Example 1, and subjected to exposure and etching.

| Components ratio: | Parts by weight |
|---|---|
| Alcohol soluble polyamide (methoxymethylol nylon) | 100 |
| Acrylate | 15 |
| Acrylamide | 20 |
| 4.4'-dimethoxy benzophenone | 2 |
| p-t-Butyl catechol | 0.2 |

Either of said compositions could produce an etching plate equal to that in Example 1.

EXAMPLE 3

The compositions prepared by severally employing zinc methacrylate, lead methacrylate, cadmium methacrylate and calcium methacrylate in lieu of zinc acrylate were respectively molded into a sheet in the same way as in Example 1, and subjected to exposure and etching.

| Components ratio: | Parts by weight |
|---|---|
| Alcohol soluble polyamide resin | 100 |
| Methacrylate | 10 |
| Acrylamide | 30 |
| 4.4'-dimethyl benzophenone | 4 |
| Ethylene thiourea | 0.3 |

Either of said compositions could produce an etching plate equal to that in Example 1.

What we claim is:
1. In a photosensitive resin composition of alcohol soluble polyamide resin containing a cross-linking agent, the improvement in which the cross-linking agent consists essentially of (A) in the range of from 4 to 40 parts by weight, per 100 parts by weight of said polyamide resin, of metal salt of acrylic acid or methacrylic acid selected from the group consisting of the zinc, lead, alkaline earth metal, cadmium and aluminum salts of acrylic acid or methacrylic acid, and mixtures thereof and (B) in the range of from 4 to 100 parts by weight, per 100 parts by weight of said polyamide resin, of acrylamide, methacrylamide or diacetone acrylamide.

2. A photosensitive resin composition according to claim 1, consisting essentially of said polyamide resin, said cross-linking agent, a photochemical initiator and a thermopolymerization inhibitor.

References Cited

UNITED STATES PATENTS

| | | | |
|---|---|---|---|
| 2,997,391 | 8/1961 | Murray et al. | 96—115 |
| 2,892,716 | 6/1959 | Martin | 96—115 |
| 3,097,097 | 7/1963 | Oster et al. | 96—115 |
| 3,147,117 | 9/1964 | Wainer et al. | 96—115 |
| 3,486,891 | 12/1969 | Wilhelm et al. | 96—115 |
| 2,760,863 | 8/1956 | Plambeck | 96—115 |

NORMAN G. TORCHIN, Primary Examiner
E. C. KIMLIN, Assistant Examiner

U.S. Cl. X.R.
204—159.24